(12) United States Patent
Ren et al.

(10) Patent No.: US 11,469,040 B2
(45) Date of Patent: Oct. 11, 2022

(54) WIRELESS MAGNETIC CHARGER WITH SOLENOIDS

(71) Applicant: Apple Inc., Cupertino, CA (US)

(72) Inventors: Saining Ren, Auckland (NZ); Christopher S. Graham, San Francisco, CA (US); Makiko K. Brzezinski, Santa Clara, CA (US); Rohan Dayal, Daly City, CA (US); Paul J. Thompson, Mountain View, CA (US)

(73) Assignee: Apple Inc., Cupertino, CA (US)

( * ) Notice: Subject to any disclaimer, the term of this patent is extended or adjusted under 35 U.S.C. 154(b) by 109 days.

(21) Appl. No.: 16/893,152

(22) Filed: Jun. 4, 2020

(65) Prior Publication Data

US 2021/0383966 A1    Dec. 9, 2021

(51) Int. Cl.
| | |
|---|---|
| *H02J 50/40* | (2016.01) |
| *H02J 50/00* | (2016.01) |
| *H01F 38/14* | (2006.01) |
| *H02J 50/10* | (2016.01) |
| *H02J 7/02* | (2016.01) |

(52) U.S. Cl.
CPC ............... *H01F 38/14* (2013.01); *H02J 7/02* (2013.01); *H02J 50/10* (2016.02)

(58) Field of Classification Search
CPC ........ H01F 38/14; H01F 27/255; H01F 27/38; H02J 7/02; H02J 50/10
See application file for complete search history.

(56) References Cited

U.S. PATENT DOCUMENTS

| | | | |
|---|---|---|---|
| 8,004,867 B2 * | 8/2011 | Nakahori | H02M 1/34 363/56.05 |
| 9,676,285 B2 * | 6/2017 | Niederhauser | B60L 3/04 |
| 2011/0210617 A1 * | 9/2011 | Randall | H01F 3/10 307/104 |
| 2018/0090991 A1 * | 3/2018 | Jol | H02J 50/10 |
| 2018/0226182 A1 * | 8/2018 | Fe | H02M 3/33523 |
| 2020/0321807 A1 * | 10/2020 | Ren | H02M 3/315 |

* cited by examiner

*Primary Examiner* — Nghia M Doan
(74) *Attorney, Agent, or Firm* — Kilpatrick Townsend & Stockton, LLP

(57) ABSTRACT

This application relates to a wireless charger with increased efficiency during operation. The wireless charging assembly includes a wireless charger and an electronic device. A transmitter coil in the wireless charger can induct magnetic flux to a receiver coil in the electronic device via a magnetic flux pathway.

20 Claims, 6 Drawing Sheets

WIRELESS MAGNETIC CHARGER WITH SOLENOIDS

FIELD

The described embodiments relate generally to inductive charging. More particularly, the present embodiments are directed towards inductive chargers with solenoids shaped for improved efficiency.

BACKGROUND OF THE INVENTION

Electronic devices, such as smart phones, tablet computers, laptop computers, smart watches, wearable devices, and the like can be powered by one or more internal batteries. Through use, the batteries can lose charge, requiring periodic recharging. Some electronic devices include circuitry that enables the batteries to be charged by connecting them to a power source via a physical cable. Other electronic devices include circuitry that enables the batteries to be recharged wirelessly, for example, by placing the electronic device on a wireless charger and inductively transferring power from a transmitter coil in the wireless charger to a receiver coil in the electronic device.

During wireless charging, magnetic flux is typically generated by the transmitter coil in the wireless charger and used by the receiver coil in the electronic device to generate electric current used, for example, to charge a battery contained within the electronic device. When traveling from the transmitter coil in the wireless charger, the magnetic flux can interact with components in the wireless charger and wireless device. The interaction between the magnetic flux and the components can reduce the magnetic flux that reaches the receiver coil in the electronic device, which in turn reduces the electric current generated by the receiver coil in the electronic device. The reduction of electric current can undesirably increase the charging time of the batteries in the electronic device and reduce the efficiency of the wireless charging system.

BRIEF SUMMARY OF THE INVENTION

This disclosure describes various embodiments that relate to inductive charging systems having improved efficiency. The inductive charging systems can include a wireless charger with a transmitter coil and an electronic device with a receiver coil. In various embodiments, the transmitter coil and/or the receiver coil can include features for directing magnetic flux from the wireless charger to the electronic device. For example, the transmitter coil can include a solenoidal structure with solenoids arranged in a pattern. The solenoidal structure can direct the magnetic flux along a pathway from a first solenoid to the electronic device and back into a second solenoid. Directing the magnetic flux along a pathway can reduce the amount of flux that is lost due to the magnetic flux interacting with components in the wireless charger and/or electronic device. Reducing the amount of magnetic flux that is lost can increase the efficiency of the system and reduce the charging time required to charge the electronic device. Directing the magnetic flux along the pathway can additionally or alternatively allow for a reduction in the size of the transmitter coil and/or the receiver coil that is used to charge the electronic device. For example, the size of the transmitter coil and/or the receiver coil can be smaller than the coils used in a traditional charging system.

In various embodiments described herein, a wireless charging system can include a wireless charger and an electronic device. The wireless charger can include a cable extending between a connector and a wireless charging assembly. A DC-to-AC converter for converting a DC power signal to AC+ and AC− signals may be disposed in the connector and/or the wireless charging assembly. The cable can include wires for transmitting the AC+, AC−, and data signals from the connector to the wireless charging assembly. The wireless charging assembly can include a housing encasing a transmitter coil with features for directing magnetic flux from the charging assembly to the electronic device. The electronic device can include a receiver coil for receiving the magnetic flux and converting the flux to an electric current for charging a battery in the electronic device.

A wireless charging device is disclosed and includes the following: a housing having a charging surface and defining a cavity within the wireless charging device; a base disposed within the cavity and comprising ferrite material, the base having a plurality of pillars extending away from the base towards the charging surface, the plurality of pillars including at least a first pillar and a second pillar spaced apart from one another; and a plurality of solenoids including at least a first solenoid wrapped around the first pillar and a second solenoid wrapped around the second pillar thereby forming a transmitter coil configured to direct magnetic flux through the charging surface.

An electronic device is disclosed and includes the following: a housing defining a recess within the electronic device; a base disposed within the recess and comprising ferrite material, the base having first and second pillars extending away from the base and spaced apart from one another and arranged radially around a center point of the base; and a receiver coil configured to receive magnetic flux, the receiver coil comprising first and second solenoids wrapped around the respective first and second pillars.

A wireless charging system is disclosed and includes the following: an electronic device comprising a casing defining a recess within the electronic device; a receiver base disposed within the recess and comprising ferrite material, the receiver base having first and second receiver pillars extending away from the receiver base and spaced apart from one another and arranged radially around a center point of the receiver base; and a receiver coil configured to receive magnetic flux, the receiver coil comprising first and second receiver solenoids wrapped around the respective first and second pillars; and a wireless charging device comprising a housing having a charging surface configured to receive the electronic device and defining a cavity within the wireless charging device; a transmitter base disposed within the cavity and comprising ferrite material, the transmitter base having a plurality of transmitter pillars extending away from the transmitter base towards the charging surface, the plurality of transmitter pillars including at least a first transmitter pillar and a second transmitter pillar spaced apart from one another; and a plurality of solenoids including at least a first transmitter solenoid wrapped around the first pillar and a second transmitter solenoid wrapped around the second pillar thereby forming a transmitter coil configured to direct magnetic flux through the charging surface.

To better understand the nature and advantages of the present invention, reference should be made to the following description and the accompanying figures. It is to be understood, however, that each of the figures is provided for the purpose of illustration only and is not intended as a definition of the limits of the scope of the present invention. Also, as a general rule, and unless it is evident to the contrary from the description, where elements in different figures use identical reference numbers, the elements are generally either identical or at least similar in function or purpose.

DETAILED DESCRIPTION OF THE INVENTION

A wireless charging system typically includes an electronic device positionable on a wireless charger. The wireless charger can include a housing with a charging surface for receiving the electronic device and a variety of components disposed within the housing, including a transmitter coil. The transmitter coil can generate and induct magnetic flux across the charging surface to the electronic device. The electronic device can include a receiver coil for receiving the magnetic flux and generating electrical current used to charge batteries contained within the electronic device. Some of the magnetic flux generated by the transmitter coil can be lost due to the interaction of the magnetic flux with components contained within the wireless charger and/or the electronic device. The lost flux reduces the amount of electric current that can be generated by the electronic device, reducing the efficiency of the charging system and increasing the charging time of the electronic device.

Various embodiments of the invention provide a solution by using transmitter and/or receiver coils with features for directing the path of magnetic flux, reducing the amount of magnetic flux lost to components within the electronic device and/or the wireless charger. For example, in some embodiments the transmitter coil and/or the receiver coil includes solenoids positioned in a pattern for directing the magnetic flux. The magnetic flux can flow in a pathway from a first solenoid of the transmitter coil, through the receiver coil of the electronic device, and back to the transmitter coil via a second solenoid. The magnetic flux pathway can reduce the amount of magnetic flux that is lost to components of the electronic device and/or the wireless charger. This in turn can increase the efficiency of the charging system and reduce the charging time of the electronic device. The magnetic flux pathway can additionally or alternatively allow for a reduction of the size of the transmitter coil and/or the receiver coil used to charge the electronic device.

These and other embodiments are discussed below with references to FIGS. 1-7; however, those skilled in the art will readily appreciate that the detailed description given herein with respect to these figures is for explanatory purposes only and should not be construed as limiting.

Figure 1A:
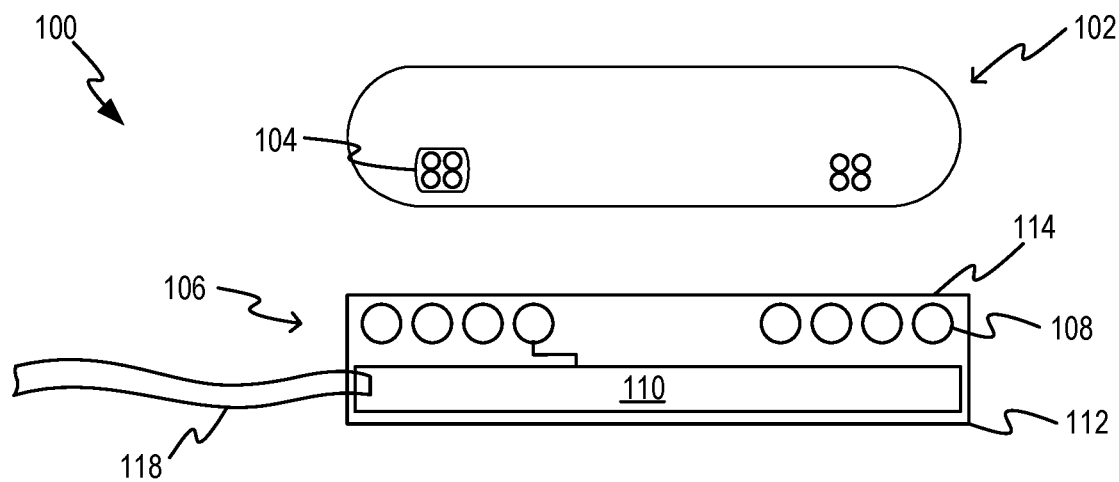
FIG. 1A is a simplified illustration of a previously known wireless charging system including an electronic device and a wireless charger.

FIG. 1A is a simplified illustration of a previously known wireless charging system 100 including an electronic device 102 and a wireless charger 106. The wireless charger 106 includes a transmitter coil 108 and electronic circuitry 110 disposed within a housing 112. Transmitter coil 108 is disposed adjacent to a charging surface 114 that can be a portion of an exterior surface of housing 112. Electronic circuitry 110 provides power to the transmitter coil and includes a DC-to-AC converter that converts a DC current received via a cable 118 from an external source (e.g., a USB connector, not shown, that provides a 5 volt DC current to the wireless charger 106) to an AC current. The AC current can be supplied to the transmitter coil 108, which generates magnetic flux, for example a time-varying electromagnetic field, that is inducted across the charging surface and can induce an electric current within a receiver coil 104 contained within an electronic device 102 when the electronic device is positioned on or adjacent to charging surface 114. The electronic device 102 can then use the induced current, for example, to recharge an internal battery.

Figure 1B:
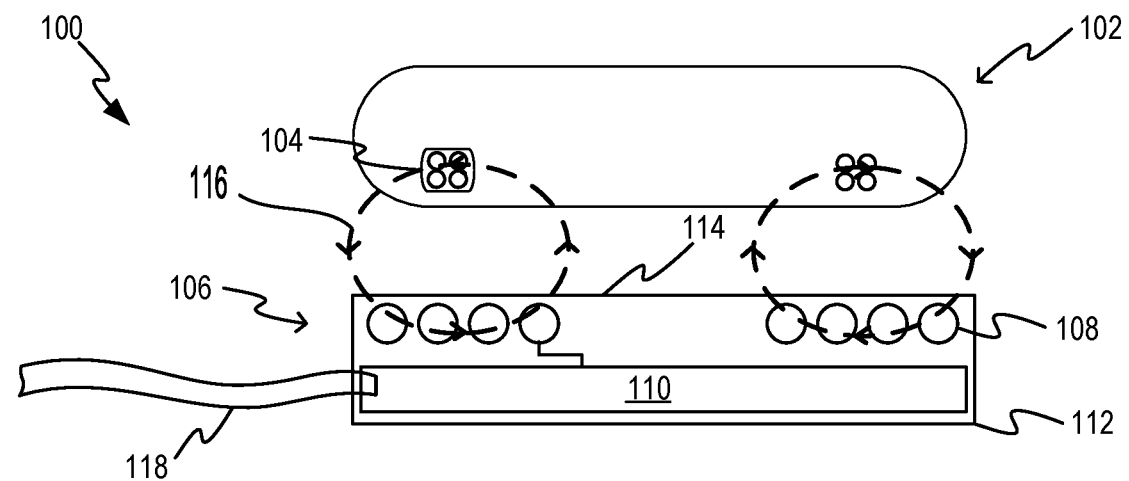
FIG. 1B is the known charging system of FIG. 1 with the magnetic flux pathway shown according to some embodiments of the present invention.

FIG. 1B is the known charging system of FIG. 1 with the magnetic flux 116 shown. The transmitter coil 108 and/or the receiver coil 104 can have a circular or oval shape that inducts the electronic flux from the transmitter coil to the receiver coil. The magnetic flux 116 can be inducted to the receiver coil 104 in a circular pattern, such that the magnetic flux flows from the interior of the transmitter coil 108 through the receiver coil 104 and back to the exterior of the transmitter coil. Components positioned near the transmitter coil 108 and/or the receiver coil 104 can interfere with the magnetic flux 116, reducing the amount of magnetic flux that travels from the transmitter coil to the receiver coil. The reduction in the magnetic flux 116 can in turn reduce the current in the receiver coil 104 and the efficiency of the wireless charging system 100, increasing the time required to charge the batteries of the electronic device 102.

Figure 2A:
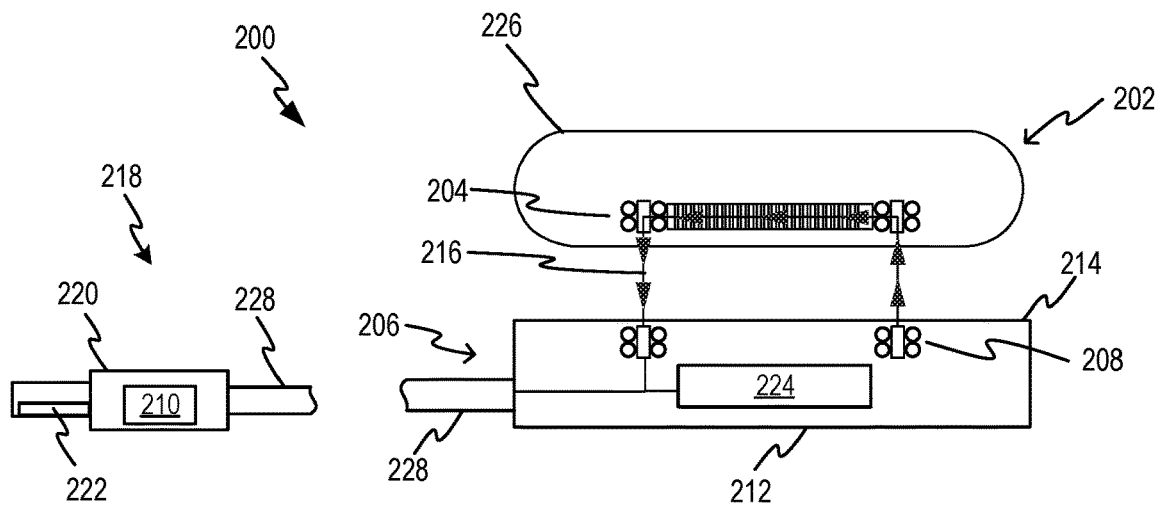
FIG. 2A is a simplified illustration of a wireless charging system including an electronic device and a wireless charger according to some embodiments of the present invention.

Turning now to FIG. 2A, a charging system 200 including an electronic device 202 and a wireless charger 206 according to some embodiments of the present invention is shown. The wireless charger 206 can include a housing 212, including a charging surface 214, surrounding a transmitter coil 208. The transmitter coil 208 can receive power from a cable 228 and generate magnetic flux 216. The magnetic flux 216 can be generated according to Oersted's law. The transmitter coil 208 can include a base of material and one or more features to aid in generating and/or guiding the magnetic flux. For example, the transmitter coil 208 can include a base of ferrite and/or solenoids formed with copper wire wound around one or more columns of ferrite. In various embodiments, the solenoids can be spaced apart from one another and arranged in a pattern for directing the magnetic flux. For example, the transmitter coil 208 can include multiple solenoids spaced apart from one another and arranged in a circular pattern. In various embodiments, the transmitter coil 208 can include solenoids spaced 90 degrees apart.

The wireless charger 206 can be connected to a connector 218 via a cable 228. The connector 218 can receive power from a power source and the cable 228 can transfer the power from the connector to the wireless charger 206. In some embodiments, the connector 218 can include electronic circuitry 210 that converts DC current to AC current. The wireless charger 206 can include a transmitter coil 208 disposed within the housing 212 and positioned adjacent to a charging surface 214. The transmitter coil 208 can receive the power from the cable 228 and generate magnetic flux (e.g., a time-varying electromagnetic field). The magnetic flux can be inducted by the transmitter coil 208 across the charging surface 214 to the electronic device 202 positioned adjacent to the charging surface (e.g., a portion of the electronic device contacting the charging surface).

The connector 218 can be electrically coupled with a power source to receive electric current. In some embodiments, the connector 218 can be a male plug connector that can be inserted into a corresponding female connector in an AC-to-DC adapter, such as an adapter that can be plugged into a standard AC wall outlet. For example, in some embodiments, connector 218 can be a type A or a type C Universal Serial Bus (USB) connector. The connector 218 can include a housing 220 that encases and protects various internal components of the connector 218. The connector 218 can receive a DC current from a power source via one or more electrical contacts 222. The contacts 222 can transmit the electric current from the power source to electronic circuitry 210. In various embodiments, the electronic circuitry 210 is disposed within housing 220, however, the electronic circuitry may be disposed within the wireless charger 206. The electronic circuitry 210 can include, among other components, a DC-to-AC converter that can receive a DC current from the power source and convert the DC current to an AC current that can be supplied to wireless charger 206 via cable 228. The contacts 222 can be arranged according to a standardized pinout (e.g., USB-A, USB-B, USB-C, etc.) that matches the pinout of the contacts in the power source. In some embodiments, the contacts 222 can include one or more contacts for receiving and/or transmitting data in addition to receiving power.

The DC-to-AC converter within the electronic circuitry 210 can receive the DC electric current from the power source via the contacts 222 and convert it to an AC+ current and an AC− current. The DC-to-AC converter can be a variety of appropriate chips or circuitry that converts a DC signal to an AC signal. In various embodiments, and as non-limiting examples, the converter can be part of an ASIC, can be within a microcontroller or other microprocessor chip or can be made from various discrete components. In some embodiments, the electronic circuitry 210 can include a Main Logic Board (MLB) and/or a Printed Circuit Board Assembly (PCBA) that has a first set of bonding pads that can be electrically coupled to the contacts 222 and a second set of bonding pads that can be coupled to wires within cable 228. The DC-to-AC converter can be mounted to the MLB and electrical traces on the MLB can couple an input of the DC-to-AC converter to a bonding pad in the first set of bonding pads that is coupled to one of the contacts 222 that receives the DC current and can couple outputs of the converter to bonding pads in the second set of bonding pads on the MLB.

The electronic device 202 can include a housing 226 encompassing the receiver coil 204. The receiver coil 204 can be positioned adjacent to charging surface 214 to receive the magnetic flux 216 generated by the transmitter coil 208 and generate electric. The electric current can be used, for example, to charge a battery contained within the electronic device 202. The receiver coil 204 can be or include wire formed into one or more shapes. For example, the receiver coil 204 can include one or more solenoids formed by wires wrapped around columns of material. The columns can be or include ferrite or a similar material that can increase the field strength of the magnetic flux received from the wireless charger 206.

Figure 2B:
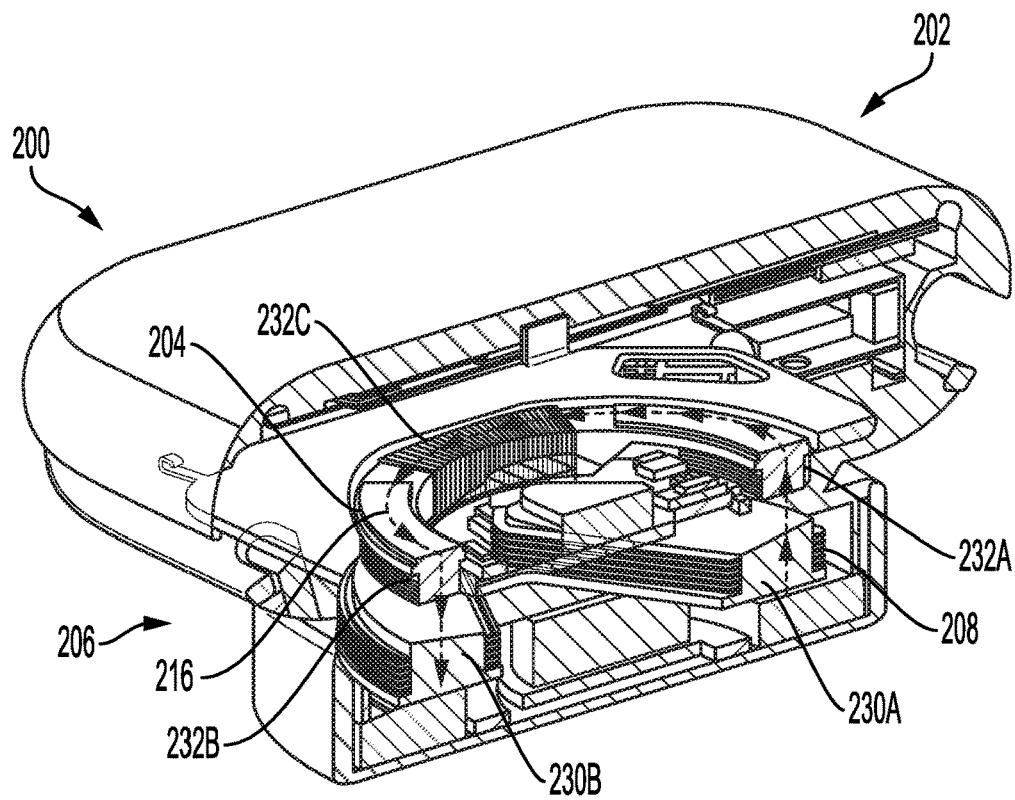
FIG. 2B is the charging system of FIG. 2 with the magnetic flux pathway shown according to some embodiments of the present invention.

Turning to FIG. 2B, a detailed cross-section of the charging system 200 and the electronic device 202 is shown according to some embodiments of the present invention. Magnetic flux 216 can flow along a magnetic pathway (e.g., a magnetic circuit) from the transmitter coil 208 across the charging surface 214 to the receiver coil 204. The transmitter coil 208 and/or the receiver coil 204 can include features to direct the magnetic flux along the pathway. For example, the transmitter coil 208 and/or the receiver coil 204 can include solenoids for generating and/or directing the magnetic flux. The magnetic flux 216 can be inducted from a first solenoid 230A of the transmitter coil 208 to a first solenoid 232A of the receiver coil 204. The magnetic flux 216 can flow through the receiver coil 204, for example around the arc of the receiver coil, to a second solenoid 232B of the receiver coil. In various embodiments, the magnetic flux 216 can pass through a third solenoid 232C positioned between the first and second solenoids 232A, 232B. The magnetic flux 216 can flow from the second solenoid 232B of the receiver coil 204 to a second solenoid 230B of the transmitter coil 208.

The pathway of the magnetic flux 216 can prevent and/or reduce magnetic flux from being lost due to interaction of the magnetic flux with components in the electronic device 202 and/or the wireless charger 206. As shown in FIG. 1B, the magnetic flux 116 does not have a magnetic pathway and flows through the air. This allows the magnetic flux 116 to interact with components that may be positioned near the transmitter coil 108 and the receiver coil 104, resulting in a loss of magnetic flux 116 and reducing the amount of magnetic flux that reaches the receiver coil. In contrast, FIG. 2B includes a magnetic pathway with a lower magnetic reluctance than the surrounding air. The lower magnetic reluctance causes the magnetic flux 216 to travel along the magnetic pathway away from components that may be positioned in the surrounding environment. This in turn increases the magnetic flux 216 flowing through the receiver coil 204 and decreasing the magnetic flux lost to the surrounding environment. Increasing the magnetic flux 216 flowing through the receiver coil 204 can increase the electrical current generated by the receiver coil and reduce inefficiency in the system. The increase in electrical current generation can, for example, reduce the charge time of the electronic device 202 positioned on the charging system 200. Additionally or alternatively, increasing the efficiency of the system can allow for a reduction in the size of the transmitter coil 208 and/or the receiver coil 204 that is used in the charging system 200 without increasing the charge time of the electronic device 202.

In some embodiments, the transmitter coil 208 can be electrically connected with control circuitry 224 for controlling the operation of the transmitter coil 208. The control circuitry 224 can, for example, turn on and off the solenoids of the transmitter coil 208. For example, solenoids can be turned on in pairs to direct the flow of the magnetic flux 216. The control circuitry 224 can be or include a MLB and/or a PCBA. The control circuitry 224 can be connected with the cable 228 to receive power and data from the connector 218 and/or the electronic circuitry 210. The control circuitry 224 can be connected to one or more solenoids. The control circuitry 224 can control the solenoids to change the polarity of the solenoids to direct the magnetic flux 216 through the receiver coil 204. For example, a first solenoid can have a positive charge and an opposing second solenoid can have a negative charge, directing the magnetic flux 216 from the positive solenoid through the receiver coil 204 to the negative solenoid.

Figure 3A:
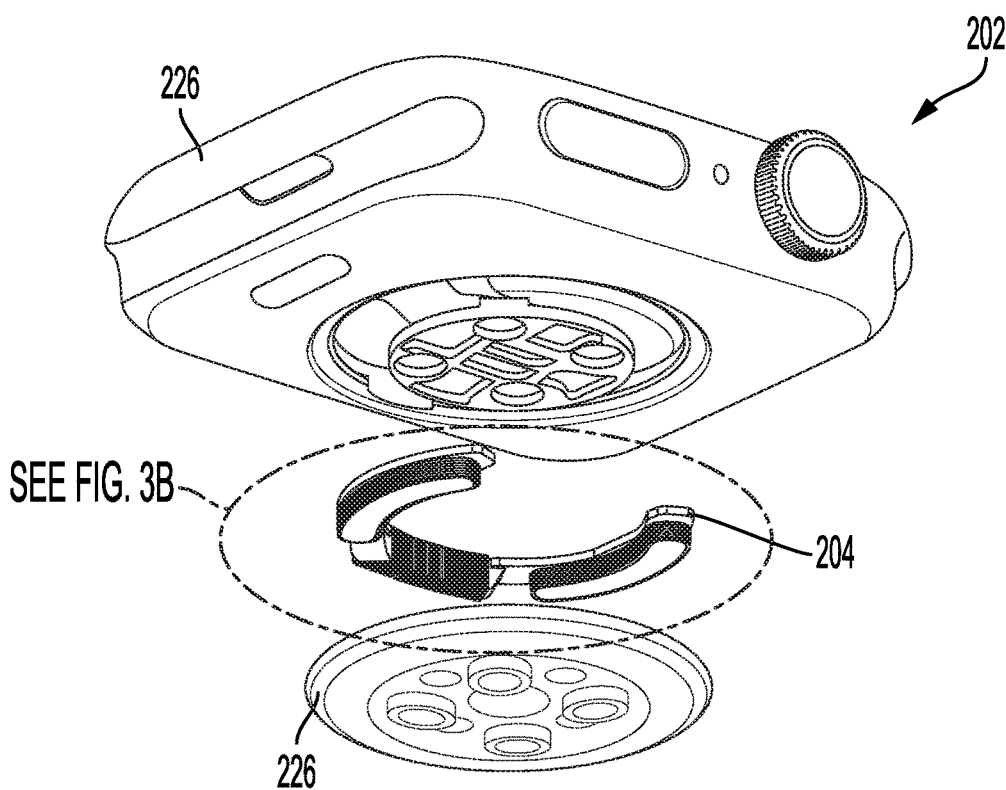
FIG. 3A is an illustration of an exploded view of an example electronic device that can be included in particular embodiments of the wireless charging system of FIG. 2 according to some embodiments of the present invention.
Figure 3B:
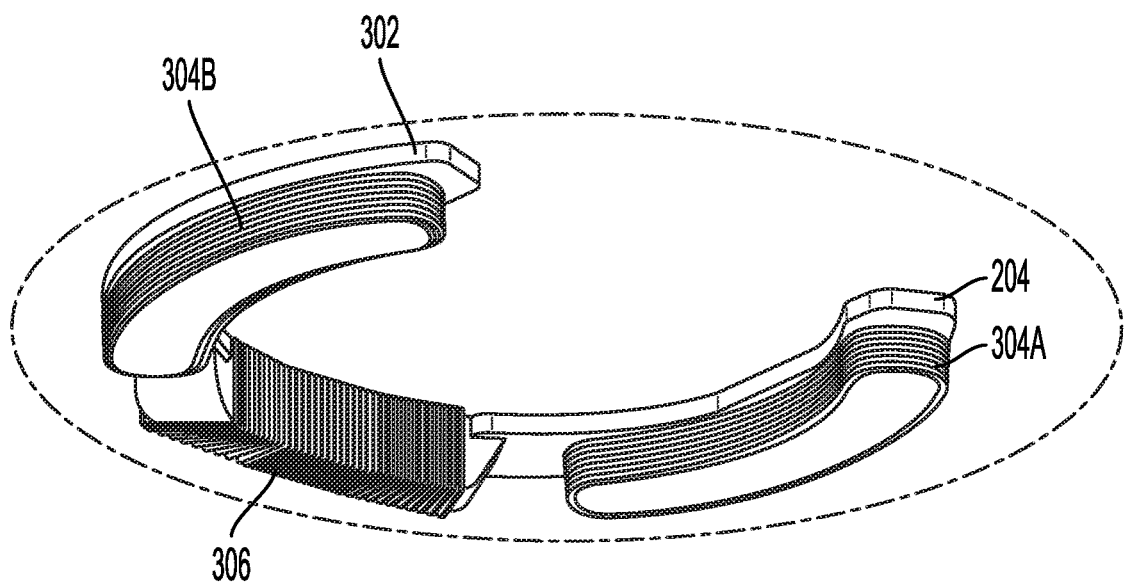
FIG. 3B is an illustration of a receiver coil that can be included in particular embodiments of the electronic device of FIG. 3A according to some embodiments of the present invention.

In various embodiments described herein, the shape and/or composition of the receiver coil 204 can direct the magnetic flux along a pathway at least partially defined by the receiver coil. For example, FIGS. 3A and 3B illustrate an example receiver coil 204 that can be included in particular embodiments of the charging system 200 of FIG. 2A according to some embodiments of the present invention. FIG. 3A is an illustration of an exploded view of an example electronic device 202 that includes a receiver coil 204 positioned within a housing 226. The housing 226 can include one or more pieces that can be assembled to surround the receiver coil 204.

As shown in FIG. 3B, the receiver coil 204 can be sized and shaped to fit within the housing 226. In various embodiments, the receiver coil 204 may be shaped to avoid other components positioned in the interior of the housing 226. For example, the receiver coil 204 may be shaped to fit around an alignment component positioned within the housing 226. The receiver coil 204 can include a base 302 and one or more solenoids 304. The solenoids 304 can include a central pillar, for example, a central pillar including ferrite. One or more wires can be wound around the central pillar of the solenoids 304. The solenoids can be electrically connected in series to form a continuous electrical pathway. In various embodiments, the receiver coil 204 can include three solenoids (e.g., 304A, 304B, and 306). The base 302 can be sized and shaped to fit the solenoids 304A, 304B, and 306. For example, the base 302 can be shaped in an arc (e.g., an arc having a horseshoe shape). The solenoids 304 can be positioned at various positions around the arc. In various embodiments, the base 302 can be or include ferrite and/or a similar material to enhance the induction of magnetic flux from the transmitter coil 208.

The solenoids 304A, 304B, and 306 can be positioned in a pattern around the base 302. For example, when the base 302 is shaped in an arc, a first solenoid 304A can be positioned at one end of the arc, a second solenoid 304B can be positioned at a second end of the arc, and a third solenoid 306 can be positioned in a middle portion of the arc between the first and second solenoids. In various embodiments, the base 302 can include one or more sections that are thicker than other sections. These thicker sections can have wire wound around the base 302 to form one or more solenoids 304. For example, the third solenoid 306 can be formed using wire wound around a thicker portion of the base 302.

In various embodiments, one or more of the solenoids 304 can have a curved shape that is the same or similar to the curvature of the base 302. For example, the first solenoid 304A can have an interior face and an opposing exterior face, one or both of which is curved. The interior face can be curved similar to or the same as the curvature of the base 302. The solenoids 304 having one or more curved surfaces can increase the amount of magnetic flux received from the transmitter coil 208. In some embodiments, the interior face can be a flat face and the exterior face can have a curvature that is similar to the curvature of the base.

In further embodiments, one or more of the solenoids 304 can be or include a pillar at least partially surrounded by a wire. For example, the solenoids 304 can include a central pillar made of ferrite and/or a similar material. The wire can be wound around at least a portion of the exterior of the central pillar. For example, the wire can be wound to cover a sidewall of the pillar from the base 302 to the top of the sidewall. The solenoids 304 can be connected in series, for example, with a single wire wound around the solenoids. However, multiple wires may be used (e.g., a wire for each solenoid) and connected in series via a pad or a conductive trace. Connecting the solenoids 304 in series allows the solenoids to function as a single coil, creating a continuous magnetic pathway for the magnetic flux 216.

The solenoids 304 can include wire wound in one or more directions. For example, solenoids 304A, 304B can be would in a horizontal orientation and solenoid 306 can be wound in a vertical orientation. The solenoids 304 may be wound in different directions to allow the electronic device 202 to be compatible with various charging systems 200. For example, the solenoids 304A and 304B may be compatible with a first charging system and the solenoid 306 may be compatible with a second charging system. However, the solenoids 304 can be used together with a charging system 200 to maximize charging of the electronic device 202. For example, the solenoids 304 can be arranged in a pattern with solenoid 306 positioned between solenoids 304A and 304B. The magnetic flux 216 can flow through all three solenoids, maximizing the electric current that is generated to charge the electronic device 202.

Figure 4A:
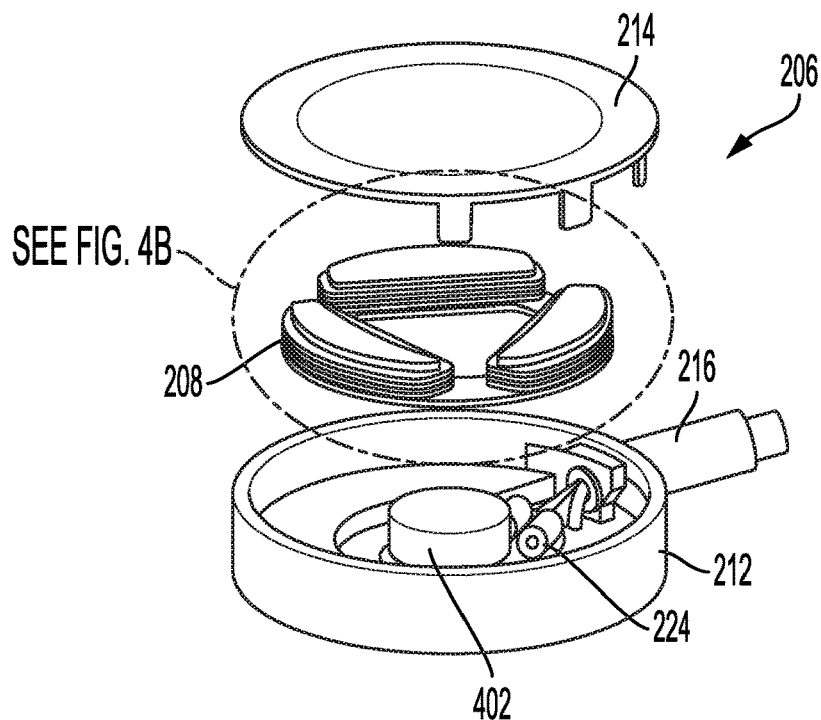
FIG. 4A is an illustration of an exploded view of an example wireless charger that can be included in particular embodiments of the wireless charging system of FIG. 2A according to some embodiments of the present invention.
Figure 4B:
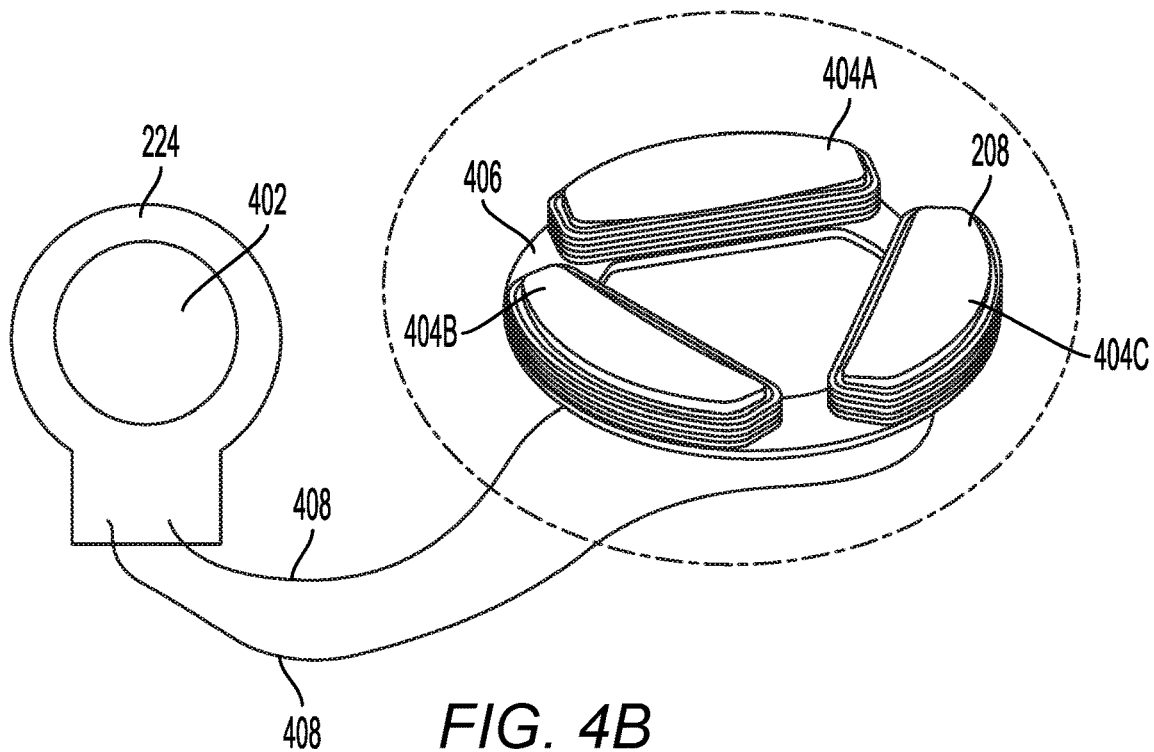
FIG. 4B is an illustration of a transmitter coil that can be included in particular embodiments of the wireless charger of FIG. 4A according to some embodiments of the present invention.

Turning to FIGS. 4A and 4B an exploded view of a wireless charger 206 including a transmitter coil 208 is shown according to some embodiments of the present invention. The wireless charger 206 can include housing 212 with charging surface 214. The housing 212 and/or the charging surface 214 can be separate pieces, however, the housing and charging surface 214 may be formed from a single piece of material. The housing 212 and/or the charging surface 214 can form an interior cavity to surround the components of the wireless charger 206. For example, the housing 212 can surround the transmitter coil 208 and control circuitry 224 positioned within the wireless charger 206.

In various embodiments, the wireless charger 206 can include one or more aligning devices 402 that can be used to align the electronic device 202 with the wireless charger 206. The aligning devices 402 can align the receiver coil of the electronic device 202 with the transmitter coil 208 of the charging system 200 to maximize the charging of the electronic device. For example, the aligning devices 402 can align the receiver coil 204 of the electronic device 202 in any one of four positions. In any of these positions, the transmitter coil 208 and the receiver coil 204 can be aligned and the flow of magnetic flux 216 between the two can be maximized. When the transmitter coil 208 and the receiver coil 204 are misaligned (e.g., between alignment positions) the flow of magnetic flux 216 may be decreased or stopped. The aligning devices 402 can be or include a magnet used to align the receiver coil 204 and the transmitter coil 208.

As shown in more detail in FIG. 4B, the transmitter coil 208 can include multiple solenoids 404 (e.g., solenoids 404A, 404B, and 404C). The solenoids 404 can be arranged in a pattern and spaced apart at various positions around a base 406. For example, the solenoids 404 can be arranged in a circular pattern. As shown, the base 406 has a circular shape, however, the base may be any suitable shape for receiving the solenoids 404. The base 406 can be or include ferrite or a similar material that can boost the magnetic flux generated by the solenoids 404. In various embodiments, the base 406 can have an open middle portion, however, the base 406 may be a solid disk of material. The solenoids 404 can be or include a central pillar made of ferrite and/or a similar material at least partially surrounded by wire.

The base 406 and/or the solenoids 404 can be electrically connected to the control circuitry 224 via wires 408. The control circuitry 224 can individually control the solenoids 404, for example, by turning them off or on. In various embodiments, two solenoids 404 can be activated to induct magnetic flux to the receiver coil 204. For example, a first solenoid 404 can have a positive charge and a second solenoid can have a negative charge. The control circuitry 224 can activate the solenoids based on the orientation of the electronic device 202 relative to the wireless charger 206. For example, in some embodiments the electronic device 202 can be positioned on the wireless charger 206 in one or more orientations. When the electronic device 202 is positioned on the charger 206 in a first orientation, the control circuitry 224 can activate the first solenoid 404A and the third solenoid 404C. When the position of the electronic device 202 is changed (e.g., the electronic device is rotated) the control circuitry 224 can activate the second solenoid 404B and the third solenoid 404C. The wireless charger 206 can determine the orientation of the electronic device 202 based on the magnetic flux 216 that is inducted to the electronic device from one or more of the solenoids 404. For example, the control circuitry 224 can pulse magnetic flux 216 to determine the orientation of the electronic device 202. In various embodiments, the control circuitry 224 can turn on and off the solenoids 404A, 404B, 404C to optimize the magnetic flux that is inducted to the receiver coil 204. For example, when the first solenoid 304A of the receiver coil 204 is positioned above the third solenoid 404C of the transmitter coil and the second solenoid 304B of the receiver coil is positioned above the second solenoid 404B, the control circuitry can activate the second and third solenoids 404B, 404C to induct magnetic flux from the third solenoid 404C of the transmitter coil to the first solenoid of the receiver coil, flow around the arc of the receiver coil to the second solenoid 304B of the receiver coil, and down into the second solenoid 404B of the transmitter coil. In further embodiments, all of the solenoids 404A, 404B, 404C can be used to induct magnetic flux to the receiver coil 204. For example, while the second and third solenoids 404B and 404C induct magnetic flux through the first and second solenoids 304A, 304B of the receiver coil 204, the first solenoid 404A of the transmitter coil 208 can induct magnetic flux to the third solenoid 306 of the receiver coil 204.

Figure 5A:
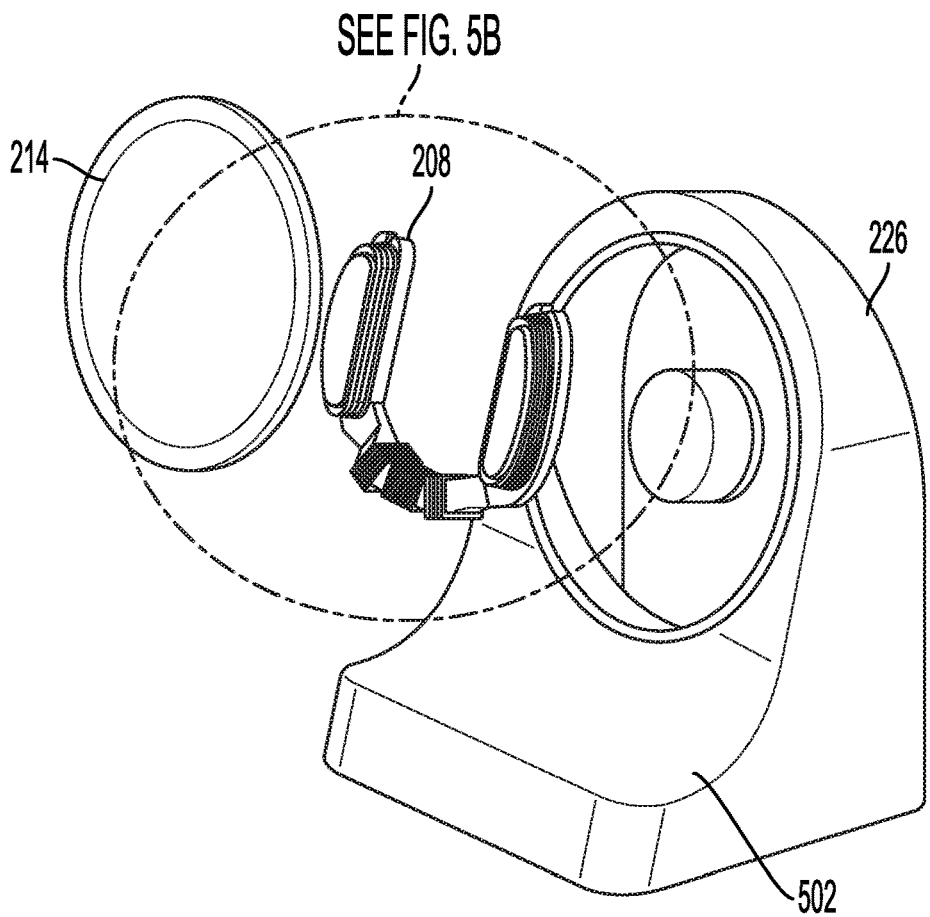
FIG. 5A is an illustration of another wireless charger that can be included in particular embodiments of the wireless charging system of FIG. 2A according to some embodiments of the present invention.
Figure 5B:
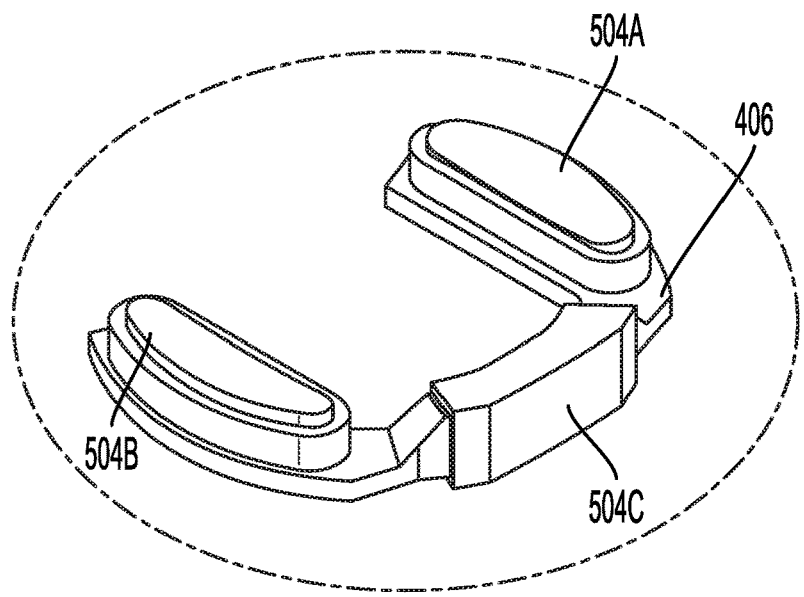
FIG. 5B is an illustration of an example transmitter coil that can be included in particular embodiments of the wireless charging system of FIG. 5A according to some embodiments of the present invention.

FIG. 5A is an illustration of another example wireless charger 206 that can be included in particular embodiments of the charging system 200 of FIG. 2A according to some embodiments of the present invention. The wireless charger 206 can include housing 212 and charging surface 214 surrounding transmitter coil 208. The housing 212 and/or the charging surface 214 can include features for aligning the receiver coil 204 and the transmitter coil 208. For example, the housing 212 can include a shelf 502 that allows the electronic device 202 to be positioned in an orientation for receiving the magnetic flux from the transmitter coil 208. In various embodiments, the centers of the receiver coil 204 and the transmitter coil 208 may be slightly offset from one another when the electronic device 202 is positioned on the wireless charger 206. The receiver coil 204 aligned with the transmitter coil 208 can reduce the number of solenoids 404 needed to induct the magnetic flux from the transmitter coil 208 to the receiver coil 204. For example, the receiver coil 204 can be aligned with the transmitter coil 208 as a mirror image of the transmitter coil 208 (e.g., the solenoids and the base arcs align). The transmitter coil 208 can include multiple solenoids 504. The solenoids 504 can be the same as or similar to solenoids 404. For example, the solenoids 504 can include a central pillar of ferrite surrounded by wire. A first solenoid 504A of the transmitter coil 208 can induct magnetic flux to a first solenoid 304A of the receiver coil 204, around the arc of the base 302 to the second solenoid 304B of the receiver coil 204, and to the second solenoid 504B of the transmitter coil 208. Additionally or alternatively, a third solenoid 504C of the transmitter coil 208 can induct magnetic flux to a third solenoid 306 of the receiver coil 204. The solenoids 504 may be oriented in multiple directions to support various charging systems. For example, solenoids 504A and 504B may be oriented in a horizontal orientation and solenoids 504C may be oriented in a vertical direction. Solenoids 504A and 504B may support charging using a first charging system and solenoid 504C may support charging using a second charging system. In various embodiments, all of the solenoids 504A, 504B, 504C may be used with one or more charging systems.

Figure 6:
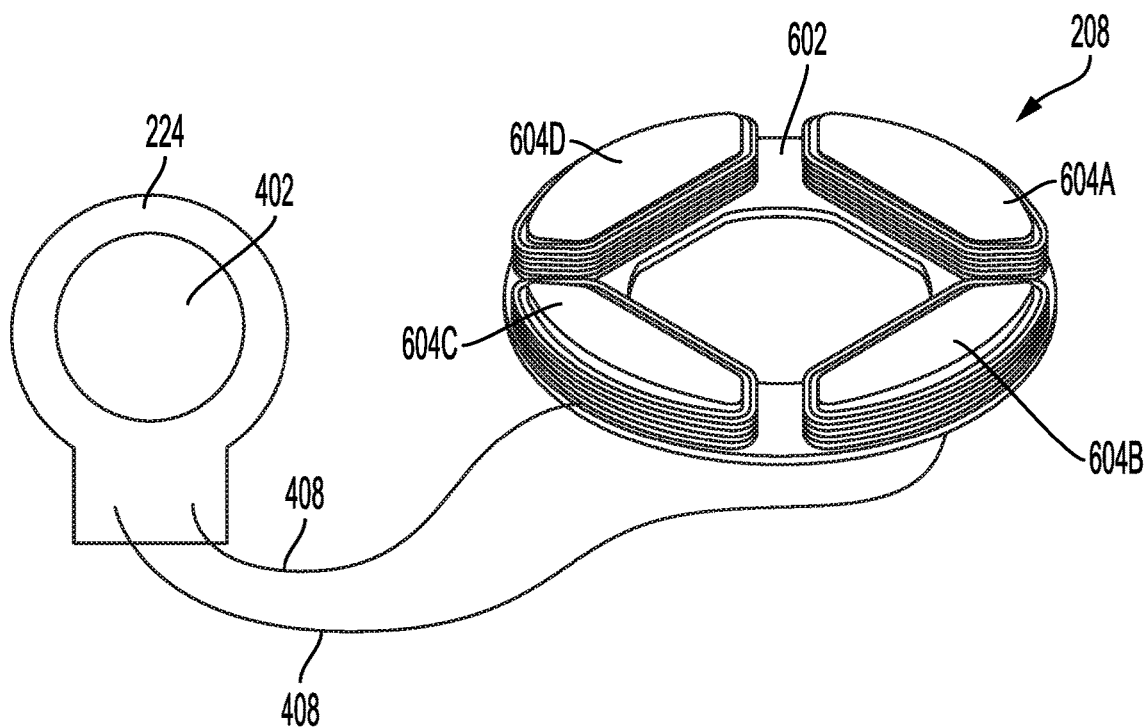
FIG. 6 is an example transmitter coil that can be included in particular embodiments of the wireless charging system of FIG. 2A according to some embodiments of the present invention.

FIG. 6 illustrates another transmitter coil 208 that can be included in particular embodiments of the wireless charger 206 of FIG. 2A according to some embodiments of the present invention. The transmitter coil 208 can include four solenoids 604A, 604B, 604C, and 604D arranged in a circle. The solenoids can be evenly spaced apart (e.g., spaced 90 degrees apart), however, the solenoids may be spaced any suitable distance apart. The solenoids 604 can similar to or the same as solenoids 404 and/or 504. The solenoids 604 can include a central ferrite pillar surrounded by wire. Control circuitry 224 can be electrically connected with the solenoids 604A, 604B, 604C, and 604D to control the solenoids. For example, the control circuitry 224 can activate two or more of the solenoids 604A, 604B, 604C, and 604D to induct the magnetic flux to the receiver coil 204. For example, opposing solenoids (e.g., 604A and 604C or 604B and 604D) can be activated to induct the magnetic flux. In various embodiments, adjacent solenoids (e.g., 604A and 604B) can be activated to induct the flux. The control circuitry 224 can activate the solenoids 604A, 604B, 604C, and 604D based on the orientation of the receiver coil 204 relative to the wireless charger 206. For example, as the orientation of the electronic device 202 changes, different solenoids 604A, 604B, 604C, and 604D can be energized to continue to induct the magnetic flux to the receiver coil 204.

In various embodiments the solenoids 604 can be energized based on at least the position of the receiver coil 204. For example, as the receiver coil 204 is rotated, different solenoids 604 can be energized. The solenoids 604 can be energized to direct magnetic flux around a portion of the receiver coil 204 along a magnetic flux pathway.

Figure 7A:
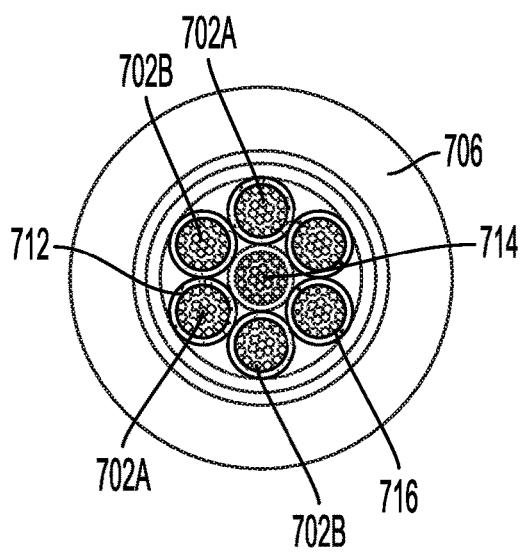
FIGS. 7A and 7B are example charging cables that can be included in particular embodiments of the wireless charging system of FIG. 2A according to some embodiments of the present invention.
Figure 7B:
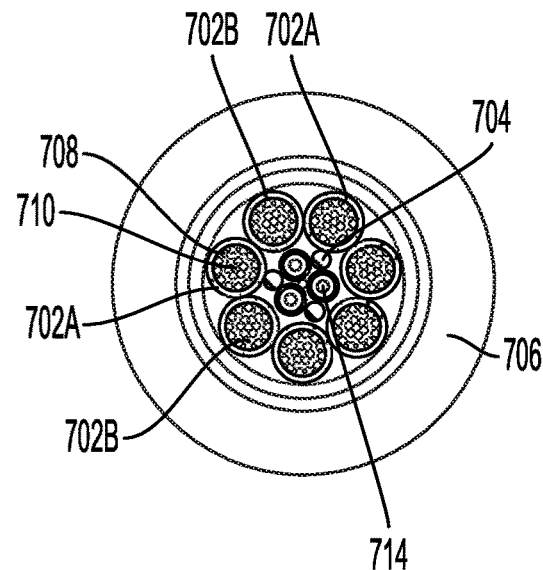

The transmitter coil 208 and/or the control circuitry 224 can receive power and/or data from cable 228 attached to the wireless charger 206. FIGS. 7A and 7B are simplified cross section of cable 228 that can be incorporated into the wireless charger 206 of FIG. 2A according to some embodiments of the present invention. The cable 228 can include one or more wire bundles 702 for transmitting an AC current along the length of the cable 228. The AC current can be split into an AC+ and an AC− current and transmitted through multiple wire bundles 702 to reduce the interference between the currents, for example a wire bundle 702A can transmit the AC− signal and wire bundle 702B can transmit an AC+ signal. The wire bundles 702 can be optimized to transmit the AC current at a specific frequency with minimal losses. In various embodiments, one or more wire bundles 702 can be used to create a common ground 716 between the connector 218 and the wireless charger 206.

The wire bundles 702A, 702B can be or include on or more strands of wire 708 that transmit the AC signal surrounding a central fiber 710 for strengthening the wire bundles 702. An electrically insulative sheath 712 can surround the wires 708 and prevent the wire bundles 702 from contacting one another. The diameter of each strand of wire 708 can be optimized to transmit the electric current at a specific frequency. For example, the diameter of each strand of wire 708 can be optimized to transmit the electric current at a frequency of about 380 hertz. The strands of wire 708 can be or include copper, copper alloy, or other electrically conductive material. The central fiber 710 can provide resistance against stresses applied to the wire bundles 702. In some embodiments, the central fiber 710 can contain conductive material. The conductive material can transmit data along the length of the cable. Additionally or alternatively, one or more data cables 714 can be positioned in the cable 228 for transmission of data to and/or from the wireless charger 206 (e.g., the orientation of the electronic device 202 on the wireless charger 206). The data cables 714 can include strands of wire 708 for transmission of the data. The data cables 714 can positioned near the center of the cable 228, such that, the wire bundles 702 are positioned between the data cables and protective layers 706.

One or more strengthening members 704 can be included in the cable 228 to increase resistance against stresses put on the cable. The strengthening members 704 can include one or more fibers (e.g., carbon fibers) for strengthening the cable 228 against stresses in a specific direction. For example, the fibers can be used to strengthen the cable 228 against tensile stresses put on the cable.

One or more protective layers 706 can surround the wire bundles 702 and/or the strengthening members 704. The one or more protective layers 706 can provide protection against electromagnetic interference, heat, and damage. The protective layers 706 can include, for example, an insulating jacket and/or a conductive shield. In some embodiments, one or more of the protective layers 706 can be an electrically conductive layer that is electrically coupled between an EMF shield in a connector and an EMF shield in a charging assembly.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

What is claimed is:

1. A wireless charging device comprising:
    a housing having a charging surface and defining a cavity within the wireless charging device;
    a base disposed within the cavity and comprising ferrite material, the base having a plurality of pillars extending away from the base towards the charging surface, the plurality of pillars including a first pillar and a second pillar spaced apart from one another; and
    a plurality of solenoids including a first solenoid wrapped around the first pillar such that the first solenoid is in contact with the first pillar along the length of the first solenoid and a second solenoid wrapped around the second pillar such that the second solenoid is in contact with the second pillar along the length of the second solenoid thereby forming a transmitter coil configured to direct magnetic flux through the charging surface.

2. The wireless charging device of claim 1, wherein the first and second solenoids are electrically coupled in series.

3. The wireless charging device of claim 1, wherein the plurality of pillars further includes a third pillar positioned between the first and second pillars, the plurality of solenoids further includes a third solenoid wrapped around the third pillar, and
    wherein the first and second solenoids are wrapped in a first direction around the respective first and second pillars and the third solenoid is wrapped around the third pillar in a second direction.

4. The wireless charging device of claim 1, wherein the first and second solenoids are in an opposing electrical relationship.

5. The wireless charging device of claim 1, wherein the first and second solenoids are independently controllable.

6. The wireless charging device of claim 1, wherein the plurality of pillars is evenly spaced apart and arranged radially around a center point of the base.

7. The wireless charging device of claim 6, wherein the first pillar has a flat interior face oriented towards the center point of the base and an opposing curved exterior face.

8. The wireless charging device of claim 1, further comprising third and fourth solenoids wrapped around respective third and fourth pillars, wherein the first, second, third, and fourth pillars are arranged radially around a center point of the base and evenly spaced apart.

9. The wireless charging device of claim 8, wherein the first, second, third and fourth solenoids are independently controllable.

10. A wireless charging device comprising:
    a housing having a charging surface and defining a cavity within the wireless charging device;
    a base disposed within the cavity and comprising ferrite material, the base having a plurality of pillars including a first pillar and a second pillar, the first pillar extending away from the base towards the charging surface, the plurality of pillars spaced apart from one another; and a plurality of solenoids including a first solenoid wrapped around the first pillar and a second solenoid wrapped around the second pillar thereby forming a transmitter coil configured to direct magnetic flux through the charging surface, wherein the first solenoid is wrapped around the first pillar in a first direction and the second solenoid is wrapped around the second pillar in a second direction.

11. An electronic device comprising:
a housing defining a recess within the electronic device;
a base disposed within the recess and comprising ferrite material, the base having first and second pillars extending away from the base and spaced apart from one another and arranged radially around a center point of the base; and
a receiver coil configured to receive magnetic flux, the receiver coil comprising first and second solenoids wrapped around the respective first and second pillars such that the first solenoid is in contact with the first pillar along the length of the first solenoid and the second solenoid is in contact with the second pillar along the length of the second solenoid.

12. The electronic device of claim 11, wherein the base has a third pillar positioned between the first and second pillars and the receiver coil further comprises a third solenoid wrapped around the third pillar, and
wherein the first and second solenoids are wrapped around the respective first and second pillars in a first direction and the third solenoid is wrapped around the third pillar in a second direction.

13. The electronic device of claim 12, wherein the first, second, and third solenoids are electrically coupled in series.

14. The electronic device of claim 11, wherein the first pillar has a curved interior face oriented toward the center point of the base and an opposing curved exterior face.

15. An electronic device comprising:
a housing defining a recess within the electronic device;
a base disposed within the recess and comprising ferrite material, the base having first and second pillars, the first pillar extending away from the base, and the first and second pillars spaced apart from one another and arranged radially around a center point of the base; and
a receiver coil configured to receive magnetic flux, the receiver coil comprising first and second solenoids wrapped around the respective first and second pillars,
wherein the first solenoid is wrapped around the first pillar in a first direction and the second solenoid is wrapped around the second pillar in a second direction.

16. A wireless charging system comprising:
an electronic device comprising a casing defining a recess within the electronic device; a receiver base disposed within the recess and comprising ferrite material, the receiver base having first and second receiver pillars extending away from the receiver base and spaced apart from one another and arranged radially around a center point of the receiver base; and a receiver coil configured to receive magnetic flux, the receiver coil comprising first and second receiver solenoids wrapped around the respective first and second pillars; and
a wireless charging device comprising a housing having a charging surface configured to receive the electronic device and defining a cavity within the wireless charging device; a transmitter base disposed within the cavity and comprising ferrite material, the transmitter base having a plurality of transmitter pillars extending away from the transmitter base towards the charging surface, the plurality of transmitter pillars including a first transmitter pillar and a second transmitter pillar spaced apart from one another; and a plurality of solenoids including a first transmitter solenoid wrapped around the first pillar such that the first transmitter solenoid is in contact with the first pillar along the length of the first transmitter solenoid and a second transmitter solenoid wrapped around the second pillar such that the second transmitter solenoid is in contact with the second pillar along the length of the second transmitter solenoid thereby forming a transmitter coil configured to direct magnetic flux through the charging surface.

17. The wireless charging system of claim 16, wherein the transmitter coil further comprises a third transmitter solenoid wrapped around a third pillar of the plurality of transmitter pillars.

18. The wireless charging system of claim 17, wherein the transmitter coil further comprises a fourth transmitter solenoid wrapped around a fourth pillar of the plurality of transmitter pillars, and wherein the transmitter solenoids are independently controllable.

19. The wireless charging system of claim 18, wherein the first, second, third, and fourth transmitter solenoids are arranged radially around a center point of the transmitter base and evenly spaced apart.

20. The wireless charging system of claim 16, wherein the first transmitter solenoid and the first receiver solenoid are in an opposing electrical relationship and the second transmitter solenoid and the second receiver solenoid are in an opposing electrical relationship.

* * * * *